Oct. 2, 1962 W. D. MEEWEZEN 3,056,915
CIRCUIT OF HIGH ALTERNATING CURRENT IMPEDANCE FOR FEEDING
A CONSTANT DIRECT CURRENT TO A CIRCUIT
Filed Aug. 28, 1958 2 Sheets-Sheet 1

INVENTOR
WILLEM D. MEEWEZEN
BY
AGENT

INVENTOR
*WILLEM D. MEEWEZEN*
BY
AGENT

United States Patent Office 3,056,915
Patented Oct. 2, 1962

3,056,915

CIRCUIT OF HIGH ALTERNATING CURRENT IMPEDANCE FOR FEEDING A CONSTANT DIRECT CURRENT TO A CIRCUIT

Willem Douwe Meewezen, Woodville, South Australia, Australia, assignor to North American Philips Company, Inc., New York, N.Y., a corporation of Delaware
Filed Aug. 28, 1958, Ser. No. 757,813
Claims priority, application Australia June 10, 1958
3 Claims. (Cl. 323—22)

The invention relates to a circuit arrangement having a high alternating current impedance for feeding a substantially constant direct current from a direct-current source to a device for the transmission of an alternating current with a maximum amplitude lower than the value of the said direct current, for example, to a telephone line.

It is frequently necessary to feed a circuit with a direct current of substantially constant value, whilst this circuit serves to transmit an alternating current with a much smaller amplitude. If a circuit is fed in this manner, it is moreover, frequently desirable to maintain the circuit in a balanced condition with respect to a point of constant potential.

In the case of circuits connecting a telephone exchange to subscribers, for example it is necessary to feed a direct current to the line in order to energize the microphone of the subscriber's set, whilst at the same time the line must transmit voice and signalling currents. Preferably, the current passing through the line is to be kept at a favourable value, in spite of the resistance of the line, in order that the microphone should operate satisfactorily.

In such conditions the feeding direct current is usually separated from the alternating current of the line, either with the aid of transformers, which allow the direct current to pass, but transfer the alternating current to a separate circuit, or with the aid of choke inductors to feed the direct current and prevent the passage of the alternating currents, and with the aid of capacitors to prevent the passage of the direct current and transfer the alternating currents. Moreover, use is made of current-dependent ballast resistors to keep the direct current in the line substantially constant. The choke inductors or the transformers used under these circumstances must conduct the direct current through the line, so that they are large and costly as compared with the size and/or the price of corresponding elements for the transmission of alternating currents only.

The present invention has for its object to provide means having a high alternating current impedance for feeding a direct current of substantially constant value to a circuit. It also has for its object to maintain the said circuit in a balanced condition with respect to a point of constant potential. Further purposes will be evident from the following description of the circuit arrangement according to the invention.

The said purposes are mainly attained by making use of the fact that the impedance of a transistor, viewed in the direction towards the collector thereof, is very high, if the voltage applied to the collector exceeds a given value, known as the "knee"-voltage. The circuit arrangement according to the invention is therefore characterized in that the required high alternating current impedance is provided, at least in part, by a transistor operating under conditions such that its emitter collector current is substantially independent of small variations in the voltage between its emitter and its collector. In such conditions a transistor is capable of passing appreciable direct currents from its emitter to its collector, whilst only a very weak alternating current can flow in the opposite direction. The "knee"-voltage of a transistor is usually of the order of 1 volt, so that it is possible to feed a telephone line, for example, by direct current via transistors, in the same manner as through choke-inductors, whilst alternating currents can be taken from the line via capacitors, the alternating current losses across the transistors being negligible.

If a line is fed in the manner described above, it is to be preferred to use a separate transistor for feeding each conductor of the line, i.e. one transistor connected to the positive terminal of a battery and one transistor connected to the negative terminal thereof. However, the value of the current should preferably be controlled by only one of the transistors.

If a telephone line is fed in this manner, it is desirable that when the loop is closed, the mean value of the potential of the two conductors forming the line should be approximately equal to the potential of the center of the battery, in order to avoid cross-talk between the dialling pulses in different lines, and so that at an interruption of the line, the potential of one of the conductors changes to a more positive value and the potential of the other conductor changes by the same amount to a more negative value. This would not be the case, if the two transistors were adjusted independently of each other, so that each of them allowed a constant current of different value to pass. The adjustment of the transistors may, however, give rise to difficulties, if they are to be adjusted to equality under variable operational conditions.

In accordance with the invention this difficulty may be overcome by providing one of the transistors with an emitter load in order to stabilize the constant current under closed loop conditions and with a base load in order to limit the base current under open loop conditions. The mean line potential can then be determined by connecting two resistors in series with each other across the line and by amplifying the potential difference between the common point of these two resistors and the desired mean potential for the line with the aid of a third transistor. The amplified potential difference is then utilized to feed the base of the second transistor, which feeds the other conductor of the line. Thus the current fed to the second transistor is adjusted automatically so that the mean potential of the line is maintained substantially at the desired value.

In an experimental embodiment of the arrangement according to the invention use was made of a supply battery of 50 v. with earth-connected positive terminal. The emitter of the first transistor was earthed via a resistor of 82 ohms. The base of this first transistor was connected to earth through a resistor of 470 ohms and to the negative terminal of the supply battery via a resistor of 3900 ohms. The collector of this first transistor was connected to the conductor of the line which had to be kept at a positive potential. The potential of the base of this transistor was of the order of about −5.5 v. to earth.

The collector of a second transistor was directly connected to the negative terminal of the battery, whereas its base was connected to the negative terminal of the battery via a resistor of 2200 ohms and its emitter directly to the negative conductor of the line.

The base of the second transistor was, moreover, connected to the collector of a third transistor, the emitter of which was connected to a central tapping of the battery and the base of which was connected to the common points of two identical resistors, which were connected in series with each other across the line and each of which had a value of 10,000 ohms.

With this arrangement the current which can flow to the positive conductor of the line and closed loop conditions, is controlled by the resistor connected in series with the emitter of the first transistor, whilst under open loop conditions, this current is controlled by the resistor network included in the base circuit of the first transistor.

The current flowing to the negative conductor of the line via the second transistor is adjusted automatically by the third transistor to a value such that the mean potential of the line is approximately equal to the potential of the centre of the battery.

With respect to alternating currents the transistors have a high impedance and hence the shunting of the line by these transistors can be neglected. In this arrangement for feeding the line, it is only required to connect blocking capacitors in series with the line in order to allow alternating currents to pass and to prevent passage of the direct current to the parts of the apparatus associated with the line which are to be isolated from the direct current source.

With this arrangement for feeding direct current to the line, the current passing through the line remained substantially constant and equal to 50 ma., in spite of variations in the line resistance between 0 and 800 ohms, whilst variations in the direct current between 40 ma. and 100 ma. occur frequently, when the line is fed via a ballast resistor of a nominal value of 100 ma.

The loss of alternating current energy due mainly to the shunting resistances, when feeding a line of 600 ohms, was of the order of 0.12 db, whilst the variations in the level of the voice currents produced in the microphone owing to variations in the resistance of the line were reduced by 3 to 4 db, and furthermore the production of noise by excessive microphone current was practically eliminated.

The invention will now be described more fully with reference to the drawings, which show circuit diagrams of embodiments of the circuit arrangement according to the invention:

Figure 1:
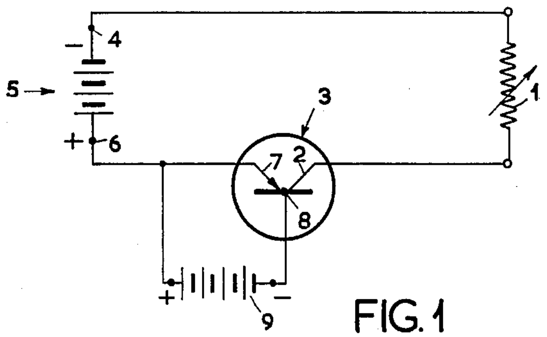
FIG. 1 is a circuit diagram of a basic circuit of theoretical significance.

The circuit arrangement shown in FIG. 1 comprises a variable resistor 1 which is connected in series between the collector 2 of a transistor 3 and one terminal 4 of a supply source 5. The other terminal of this supply source is connected to the emitter 7 of the transistor, whilst the base 8 of the transistor 3 is connected to the emitter 7 via a current source 9.

In such an arrangement, the direct current through the resistor 1 and the collector 2 of the transistor is substantially independent of the value of the resistor 1, provided that the voltage between the emitter 7 and the collector 2 does not drop below a given value determined by the type of the transistor and the voltages applied to the further electrodes thereof. Such a circuit thus stabilizes the current passing through the resistor 1. At the same time this independence of the collector direct current with respect to the potential difference between collector and emitter indicates that the transistor has a high impedance for alternating currents applied in series or in parallel with the resistor 1 and having an amplitude lower than the value of the direct current.

Such a circuit may therefore be used for feeding a device such as a telephone line with a constant direct current, if weaker alternating currents pass through this device or line, whilst appreciable losses owing to leakage of alternating current across the transistor are avoided. In such an arrangement a short-circuit of the device or the line does not appreciably affect the current from the supply source, whilst, if the device or line is interrupted or if the resistance of the device exceeds a given value, the current from the supply source changes strongly.

These conditions of independence of the emitter-collector current with respect to the emitter collector voltage and of high impedance for alternating currents obtain when the potential difference between emitter and collector exceeds the value corresponding to the "knee" or bend of the characteristic curves of the transistor representing the emitter-collector current as a function of the emitter-collector voltage.

With the arrangement shown in FIG. 1 there is the risk that if the value of the resistor 1 is raised so that it corresponds practically to open circuit conditions, an excessively high current would flow between the emitter and the base of the transistor. In a practical arrangement, it is therefore necessary to include a series resistor in the base circuit of the transistor, in order to avoid this. Similarly in order to avoid an excessive voltage between the emitter and the collector of the transistor, if the value of the resistor 1 is very low, a resistor should preferably be included in series in the emitter circuit of the transistor.

Figure 2:
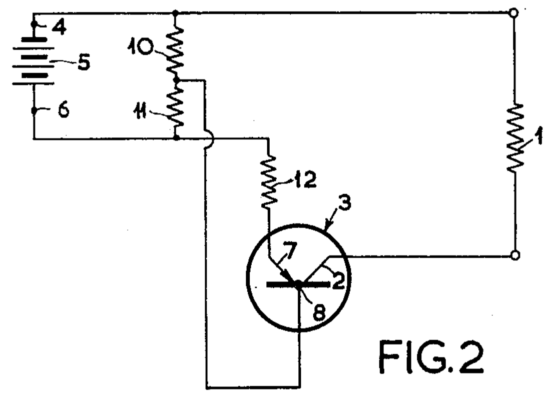
FIGS. 2, 3 and 4 are circuit diagrams of three different embodiments of the circuit arrangement according to the invention, suitable for practical use.

FIG. 2 shows a practical embodiment based on the arrangement shown in FIG. 1. In this figure, the reference numerals 1 to 7 designate circuit elements corresponding to those of FIG. 1. A resistor 12 is connected in series with the emitter 7 of the transistor 3 and the base electrode 8 of this transistor is fed with a suitable voltage and current by means of a resistor network 10, 11 connected across the supply source 5.

In the arrangement shown in FIG. 2 the resistor 1, which represents a device or a line with two conductors, is connected unilaterally directly to the supply source 5. If it is desired that the two conductors of a line or the two terminals of a device should be isolated from both terminals of the supply source 5, an element having a high impedance for alternating currents must be connected between the terminal 4 of the supply source 5, and the line or the device. This element may be constituted by an inductor of a suitable value or by a different known device; however, in accordance with the invention it is preferable to use a second transistor to this end.

Figure 3:
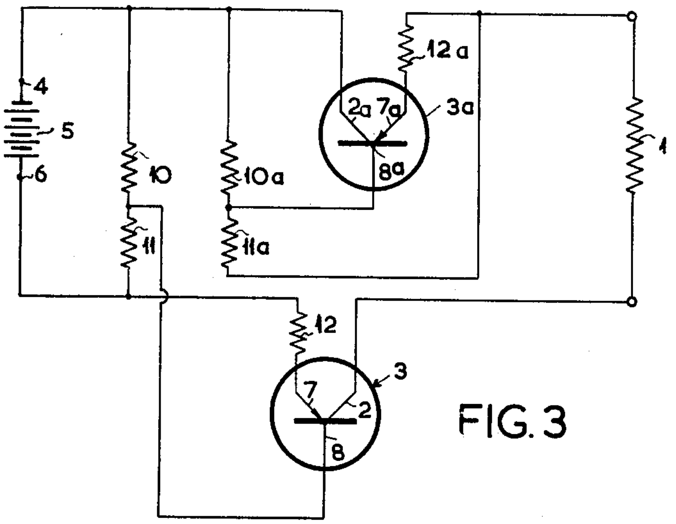

A simple arrangement according to the invention, in which use is made of two transistors, one for each conductor of a line with two conductors or for each terminal of a device, is shown in FIG. 3. In this figure, the two transistors are designated by 3 and **3*a*. The elements co-operating with the transistor 3 are designated by reference numerals corresponding with those used in FIG. 2. The elements co-operating with the transistor 3*a*** are designated by the same reference numerals, to which the suffix "*a*" is added. The collector **2*a* of the transistor 3*a* is connected to the terminal 4 of the supply source 5 and its emitter 7*a* is connected via a resistor 12*a* to the terminal of the line or device 1 to which the collector 2 of the transistor 3 is not connected. The base 8*a* of the transistor 3*a* is connected to the terminal 4 of the supply source 5 via a resistor 10*a* and via a resistor 11*a* to the terminal of the line connected to the emitter 7*a*, so that the line 1 is connected effectively in series with the collector 2*a***, via the current supply source.

The electrodes of the transistor 3 are connected in the same manner as shown in the embodiment of FIG. 2.

The transistor **3*a* could of course also be a transistor of the npn-type, i.e. a type opposite that of the transistor 3, which is a transistor of the pnp-type in which case the connections of the transistor 3*a* would be a mirror image of those of the transistor 3**.

The resistor 12 and/or the resistor **12*a*** may, if desired, be omitted.

In the arrangement shown in FIG. 3 the resistance included in the emitter-collector circuit of each of the transistors is formed by the resistance of the line or device 1 in series with the direct current resistance of the emitter collector electrode path of the other transistor. If the base electrode of one of the transistors is at a potential at which the corresponding base current is low as compared with the base current of the other transistor, the direct current resistance of the first-mentioned transistor is very high and the potential difference between the emitter and the collector of the other transistor is very low.

Accordingly, when using the arrangement shown in FIG. 3, it must be cared for that the voltages applied to the base electrodes of the two transistors should be such that each transistor passes substantially the same current, since otherwise one of the transistors would be driven below the "knee" of its characteristic curve, so that its alternating current impedance would be reduced.

In order to render the adjustment of the base-emitter voltage of the transistors less critical, it is to be preferred to give to the potential applied to the base of only one of the transistors a value selected to control the magnitude of the current, and to vary automatically the voltage between the emitter and the base of the second transistor in order to adjust the second transistor so that it allows approximately the same current to pass as the first transistor.

This desired condition may be attained by amplifying the variations of the voltage across the line and by applying the amplified voltage to the base of the second transistor, in order to control the direct current resistance of this transistor.

In applications of the invention to balanced alternating current circuits, it is furthermore desirable that any variation in direct-current potential of one of the conductors of a line with two conductors or of a terminal of a device having two terminals should produce a corresponding variation in the direct-current potential to earth of the other conductor or terminal, in order to minimize any possibility of cross-talk or the like in the case of variations in the direct current flowing in the line or of variations in the resistance of the line.

Under certain circumstances it may again be desirable to maintain a given ratio between the variations of the potential differences between a conductor of the line and earth and between the other conductor and earth.

Figure 4:
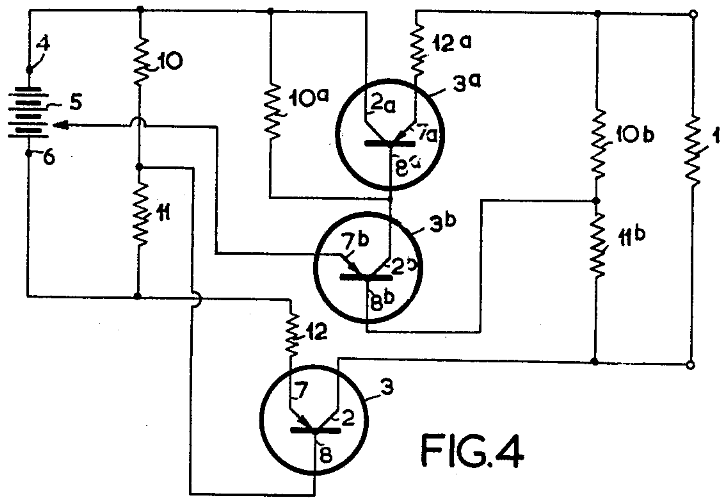

FIG. 4 shows an arrangement according to the invention, which permits of fulfilling these desired conditions. In this arrangement the transistor 3 is used to determine the current passing through the line; the elements cooperating with this transistor are designated by references corresponding to those used in FIG. 2. The current passing through the transistor 3 may be adjusted by varying the ratio between the resistors 10 and 11.

Reference 3*a* designates a transistor which corresponds to the transistor 3*a* of FIG. 3 and of which the collector 2*a* is connected to the terminal 4 of the supply source 5, whilst the emitter is connected via a resistor 12*a* to the line or device 1.

The base electrode of this transistor 3*a* is connected to the collector 2*b* of a third transistor 3*b*, and moreover via a resistor 10*a*, to the terminal 4 of the supply source 5. The base of the transistor 3*b* is connected to the junction of two resistors 10*b* and 11*b*, which are connected in series with each other across the line or device 1. The emitter of the transistor 3*b* is connected to a tapping of the supply source 5.

In an arrangement as shown in FIG. 4 the current through the line or device 1 may be adjusted to a substantially constant value by suitable choice of the respective values of the resistors 10 and 11, which control the base voltage of the transistor 3. By suitable choice of the tapping of the supply source 5, connected to the emitter 7*b*, and of the respective values of the resistors 10*b* and 11*b*, via which the base of the transistor 3*b* is fed, the ratio of the respective voltage drops across the two transistors may be kept substantially constant, and, therefore, if the current source 5 is connected to earth, the ratio of the respective variations in the voltages between each of the two conductors or terminals of the line or device 1 and earth may also be kept substantially constant.

If the emitter of the transistor 3*b* is connected to a central tapping of the current source 5, whereas the resistors 10*b* and 11*b* have approximately the same value and the current source 5 is connected to earth, for example, any variation in direct current through the line or device 1 or any variation in the reactance of the line or device 1 produces substantially identical variations in the respective voltage between each of the two conductors of the line and earth, so that the said direct-current variations or reactance variations cannot produce unequal variations in the potentials of the terminals of the line or device, which are likely to affect the alternating current circuits connected to the line or device. At the same time the value of the direct current through the line or device can be adjusted to any desired constant value by varying the potential of the base electrode of the transistor 3.

The experimental arrangement described above, as well as the practical arrangements, described with reference to FIGS. 2, 3 and 4, are only examples of uses of the invention.

This means that the indicated values of the various elements as well as the arrangements may be altered in accordance with the prevailing requirements. Moreover, the invention is not restricted to the feeding of telephone lines.

What is claimed is:

1. A circuit having a high alternating current impedance for feeding a substantially constant direct current from first and second terminals of a direct current source to first and second terminals of a device for the transmission of alternating currents having a maximum amplitude less than the value of said direct current, said circuit comprising a first transistor having its collector-emitter path connected between said first terminal of said source and said first terminal of said device, a second transistor having its collector-emitter path connected between said second terminal of said source and said second terminal of said device, said transistors being operated under conditions that their respective emitter-collector currents are substantially independent of small variations in the voltage effective between their emitter and collector electrodes, means providing a forward bias current connected between the base and emitter electrodes of said first transistor, voltage divider means connected between said first and second terminals of said device, means providing a voltage dependent upon the voltage difference between a tap on said voltage divider and a point of constant potential on said direct current source, and means applying said dependent voltage to the base electrode of said second transistor.

2. The circuit of claim 1, in which said voltage divider comprises a pair of series connected resistors of equal resistance, said tap comprising the junction of said resistors, and said point of constant potential is midway between the respective potentials of the terminals of said direct current source.

3. A circuit having a high alternating current impedance for feeding a substantially constant direct current from first and second terminals of a direct current source to first and second terminals of a device for the transmission of alternating currents having a maximum amplitude less than the value of said direct current, said circuit comprising a first transistor having its collector-emitter path connected between said first terminal of said source and said first terminal of said device, a second transistor having its collector-emitter path connected between said second terminal of said source and said second terminal of said device, said transistors being operated under conditions that their respective emitter-collector currents are substantially independent of small variations in the voltage effective between their emitter and collector electrodes, means providing a forward bias current connected between the base and emitter electrodes of said first transistor, voltage divider means connected between said first and second terminals of said device, a third transistor, means connecting the collector-emitter path of said third transistor between a point of constant potential on said direct-current source and the base electrode of said second transistor, and means connecting the base electrode of said third transistor to a tap on said voltage divider.

References Cited in the file of this patent

UNITED STATES PATENTS

| | | |
|---|---|---|
| 2,801,346 | Rongen | July 30, 1957 |
| 2,897,429 | Jochems | July 28, 1959 |
| 2,897,430 | Te Winkel | July 28, 1959 |
| 2,903,640 | Bixby | Sept. 8, 1959 |